UNITED STATES PATENT OFFICE.

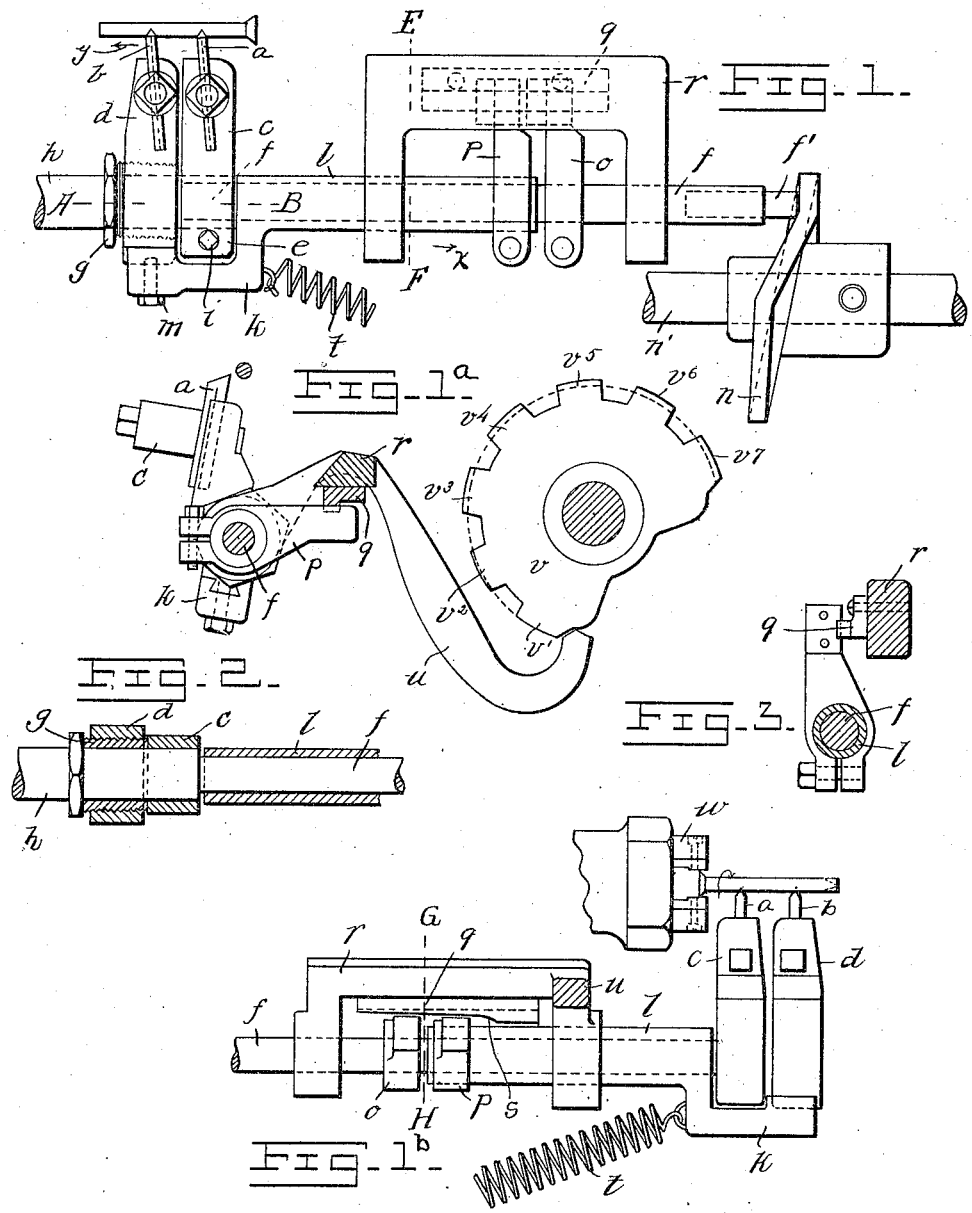

CLEMENS WINCKELMANN, OF BERLIN, GERMANY.

DEVICE FOR CUTTING SCREW-THREADS.

No. 861,567.              Specification of Letters Patent.              Patented July 30, 1907.

Application filed July 26, 1901. Serial No. 69,773.

*To all whom it may concern:*

Be it known that I, CLEMENS WINCKELMANN, a subject of the German Emperor, of No. 91 and 92 Alt-Moabit, Berlin, in the Empire of Germany, manufacturer, have invented a certain new and useful Improved Device for Cutting Screw-Threads, of which the following is a clear, full, and exact description.

This invention relates to improvements in screw cutting machines of that class, in which two or more tools are employed for cutting the same blank.

It is especially designed for cutting wood screws to be made with comparatively long threads, and is adapted for use in connection with the general type of machine illustrated and described in United States Letters Patent No. 589,143, granted August 31, 1897 to Sargent & Page.

The object of this invention is to arrange and operatively connect the two or more tools in such a manner that each tool cuts only a portion of the screw thread length, thus correspondingly reducing the longitudinal movement of the tools and that the separate tools can be adjusted independently. This arrangement enables the screws to be made in a quicker manner; the independent adjustment of that tool which is cutting the portion close to the point of the screw allows of the proper formation or threading of the screw point.

Referring to the accompanying drawings, Figure 1 is a plan assuming the tool holders $d$ $c$ to be located in the horizontal plane of the yoke $r$; Fig. 1ª is a diagrammatical view of the arrangement of the tool holders and the yoke with the cam wheel for determining the position of the tools. Fig. 1ᵇ is a rear view of the yoke and tool holders, showing also the blank held in the lathe chuck, the line G—H of this fig. indicating the section-plane for Fig. 1ª. Fig. 2 is a section on line A—B of Fig. 1; Fig. 3 is a section on line E—F of Fig. 1.

The arrangement shown in the drawings indicates how the invention can be carried out with two tools.

$a$ and $b$ are the two tools operating on the same side against the screw blank held in a lathe chuck $w$ as shown in Fig. 1ᵇ (rear view). The blank is supported by a semi-hollowed abutment (not shown in the drawing) in a known manner. The distance between the two tools is so regulated that it corresponds to one-half of the length of the screw thread to be made. When the tool $a$ is cutting the inner part of the thread (up to the middle) the tool $b$ cuts the thread on the other part up to the screw point. The adjustment must be such that the thread-cut made by the one tool runs into the other. It is obvious that if there were three tools, the distance would be reduced to one third. This indicates the length over which the stroke must extend, which is imparted to the tool holders.

$c$ and $d$ are the tool holders for the tools $a$ and $b$ respectively. The tool holder $c$ is adjustably attached to a rocking shaft $f$ by means of a clamp $e$ provided with the tightening screw $i$. The tool holder $d$ is mounted concentrically on the axis of the shaft $f$ by means of a threaded hub $g$, which is loosely fitted on an extended portion $h$ of the shaft $f$. Between the tool holder $d$ and a sleeve $l$ loosely mounted on the shaft $f$ is a connecting bracket $k$, and the holder $d$ can slide on the same and be secured by a screw $m$ in its adjusted position. By this connection, any rocking movement of the sleeve $l$ is transmitted to the tool holder $d$.

The shaft $f$ carrying the sleeve $l$, which has no independent longitudinal play thereon, is slidably mounted in bearings of the machine frame and is moved longitudinally by means of a revolving cam $n$ attached to the shaft $n'$, which derives its turning motion from the driving mechanism of the machine. The end of the shaft $f$ is hollow and a pin $f'$, preferably made of hardened steel, is inserted therein. When the shaft $n'$ rotates, this pin $f'$ is acted on by the cam $n$, thus producing the longitudinal movement of the shaft $f$ and sleeve $l$ together with the tool holders $c$ $d$ in the direction of the arrow $y$ (Fig. 1). By means of a spring $t$, these connected parts are retracted in the opposite direction, so that the return stroke takes place according as the cam $n$ allows of such movement. It is obvious that the pitch of the stroke of the cam need not be appreciably greater than one half of the length of the screw thread to be made on the blank, thus avoiding the difficulty of constructing comparatively large cams having pitches corresponding to the feed along the whole length of the screw thread.

Each of the tools is moved laterally against the screw blank by independent rocking motion transmitted by the shaft $f$ and sleeve $l$ respectively. For this purpose, the shaft $f$ is provided with an abutting arm $o$ and the sleeve $l$ with an abutting arm $p$, both arms being in juxtaposition and located with their ends in the path of a rail $q$. The latter is fixed at the rear side of a shifting yoke $r$, which is pivotally suspended on the shaft $f$ as shown in Fig. 1ª and is adapted to be lowered gradually so as to depress the abutting arms sliding on the rail $q$ to the extent necessary for allowing the tools to cut into the blank. The well known means for effecting this shifting action may consist of an arm $u$ (Fig. 1ª) attached to the yoke $r$ and a cam wheel $v$ provided with cam projections $v'$, $v^2$, $v^3$, $v^4$, $v^5$, $v^6$ and $v^7$ which successively act upon the arm $u$ when it is turned in the direction of the arrow by a suitable ratchet mechanism. According as the higher steps of the cam wheel $v$ act against the arm $u$ the yoke $r$ will be more depressed and the tools will cut deeper into the blank. This shifting mechanism is well known in screw cutting machines and forms no part of the invention. It will be understood that after each feed stroke has taken place and the front tool $b$ has arrived at the end of the blank, both tool holders are tilted back and then the return stroke takes place until the tools assume the starting position. The heads of the abutting arms o p slide, during this reciprocatory movement, on the rail q as shown in Fig. 1b.

The rail q is provided with an incline s at the one end and while the abutting arm o does not reach up to this incline s when passing along the rail, the other abutting arm p rides on the incline s at the end of the stroke. Thus the sleeve l and tool holder d are tilted against the axis of the blank, so that the tool b produces the threading and cutting of the screw point (as indicated in dotted lines in Fig. 1b) before each feed stroke is completed.

It is obvious to anyone versed in the art that before the screw cutting is commenced, the blank, previously formed with a head, is grasped by the chuck such as w (Fig. 1b) and presented to the tools while it is supported from the rear by the counter-bearing. Then by the reciprocatory movement of the tools, the thread is cut in the described manner under the condition that the tools in the starting position are every time advanced to cut deeper than in the preceding stroke.

Since the blank in the device according to the invention is engaged by the tools simultaneously at two points considerably apart from each other, the blank is properly held against its counter-bearing which is semi-hollowed as above-stated. The advantage thus attained is that the accidental displacement from the central position and deformation of the screw are avoided.

A further advantage is that by the limitation of the stroke to a part of the entire length of the thread i. e. one half for the example shown, the reciprocatory movement can take place more rapidly, so that the finishing of each screw is effected in a shorter space of time than when adopting the usual arrangement in which the tool or tools are each time carried along the entire length of the thread.

The fact that the tool holders can be adjustably fixed independently enables their adaptation to different sizes of screws. The adjusting device comprising the externally threaded hub g, shown in Figs. 1 and 2 as connected with the tool holder d, serves to increase and decrease the distance between the tool holders.

The connecting bracket k is provided with a slide way (Figs. 1 and 1a) for the purpose of sliding engagement with the tool holder d which is thus capable of axial sliding movement if the screw m is loosened. The adjustment is effected by screwing the hub g more or less through the screw-threaded core of the tool holder, whereby the latter is shifted into the desired position; then it is fixed in this position by tightening the screw m.

It will be seen from the drawings (Fig. 1), that the abutting arms o and p are also adjustably fixed on the shaft f and the sleeve l respectively, by means of clamping screws, so as to enable the operator to regulate the tilting movement of the tool holders.

Having now particularly described and ascertained the nature of the said invention, I declare that what I claim and wish to secure by Letters Patent is:—

1. In a device for cutting screw threads, a shaft, a cutting tool holder adjustably secured thereto, a sleeve slidably and rotatably mounted on said shaft, a cutting tool holder adjustably secured to said sleeve and rotatable about said shaft, cutting tools secured to each of said holders, and means for operating said holders and tools independently of each other, substantially as shown and described.

2. In a device for cutting screw threads, a shaft, a tool holder adjustably secured thereto, a sleeve slidably and rotatably mounted on said shaft, a tool holder secured to the said sleeve and rotatable about said shaft, cutting tools secured in each of said holders, an abutting arm adjustably secured to said sleeve and another abutting arm adjustably secured to said shaft, a yoke, a rail secured to said yoke and upon which said abutting arms slide, a cam mechanism producing reciprocatory movement for said shaft, means for maintaining the contact of said shaft with said cam mechanism and means for operating said cam mechanism, substantially as shown and described.

3. In a device for cutting screw threads, a shaft, a sleeve loosely mounted on said shaft, a tool holder adjustably secured to said sleeve, and provided with a screw threaded core an externally screw threaded hub mounted on said shaft, and engaging said screw threaded core, substantially as shown and described.

In witness whereof I have hereunto set my hand in presence of two witnesses.

CLEMENS WINCKELMANN.

Witnesses:
WOLDEMAR HAUPT,
HENRY HASPER.